(12) United States Patent
Saito et al.

(10) Patent No.: US 7,890,231 B2
(45) Date of Patent: Feb. 15, 2011

(54) LANE KEEPING ASSISTANCE EQUIPMENT FOR AUTOMOTIVE VEHICLES

(75) Inventors: Toru Saito, Tokyo (JP); Shinya Kudo, Tokyo (JP); Hajime Oyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 971 days.

(21) Appl. No.: 11/693,050

(22) Filed: Mar. 29, 2007

(65) Prior Publication Data

US 2007/0233343 A1    Oct. 4, 2007

(30) Foreign Application Priority Data

Mar. 29, 2006    (JP) .............................. 2006-090183

(51) Int. Cl.
*B62D 6/00* (2006.01)
(52) U.S. Cl. ......................................... 701/41; 701/301
(58) Field of Classification Search ............. 701/41–44, 701/300–302; 340/435–436
See application file for complete search history.

(56) References Cited

U.S. PATENT DOCUMENTS

| | | | |
|---|---|---|---|
| 6,216,079 B1 * | 4/2001 | Matsuda | 701/70 |
| 6,487,501 B1 * | 11/2002 | Jeon | 701/301 |
| 6,489,887 B2 * | 12/2002 | Satoh et al. | 340/436 |
| 7,091,838 B2 * | 8/2006 | Shimakage | 340/436 |
| 7,236,884 B2 * | 6/2007 | Matsumoto et al. | 701/300 |

FOREIGN PATENT DOCUMENTS

| | | |
|---|---|---|
| JP | 07-104850 | 4/1995 |
| JP | 10-283477 | 10/1998 |
| JP | 2001-039326 A | 2/2001 |
| JP | 2001-092970 A | 4/2001 |
| JP | 2004-231096 A | 8/2004 |
| JP | 2005-041308 A | 2/2005 |
| JP | 2005-071185 A | 3/2005 |

* cited by examiner

*Primary Examiner*—Yonel Beaulieu
(74) *Attorney, Agent, or Firm*—Haynes and Boone, LLP

(57) ABSTRACT

A lane keeping assistance equipment loaded on an automotive vehicle having a response motion unit for controlling a steering of the vehicle traveling on a traffic lane between lane markings, having a lane marking detecting device for detecting a lane marking location; a sideways distance detecting device for detecting a sideways distance between the lane marking location and the vehicle; and a control device for controlling lane keeping by setting a travel target point and signaling the response motion unit for the vehicle to travel on that point, wherein, corresponding to changes in the distance amount between the lane marking location and the vehicle during a driver's continuing intervening steering act and a prescribed time afterwards, the control device updates the distance amount between the travel target point and the lane marking location after that prescribed time elapses.

19 Claims, 13 Drawing Sheets

PRIOR ART

(A)

(B)

(C)

LANE KEEPING ASSISTANCE EQUIPMENT FOR AUTOMOTIVE VEHICLES

CROSS-REFERENCE TO RELATED APPLICATIONS

This application claims priority under 35 U.S.C. 119 based upon Japanese Patent Application Serial No. 2006-090183, filed on Mar. 29, 2006. The entire disclosure of the aforesaid application is incorporated herein by reference.

FIELD OF THE INVENTION

The present invention relates to lane keeping assistance equipment and more particularly, to lane keeping assistance equipment for automatically assisting the steering, etc. of the steering wheel, so that the automotive vehicle runs while following a lane.

BACKGROUND OF THE INVENTION

In recent years, the development of "keep-lane" technologies has been progressing. Such technologies are for preventing in advance deviations by vehicles of passenger cars, etc., from the lane markings at either the left or right of the driving lanes.

As such "keep-lane" technologies, the development of devices for controlling straying avoidance by determining the possibility of lane deviations have been advancing. Besides such efforts, the development of lane keeping assistance devices that automatically control so that the vehicle travels along the driving lane currently being advanced along, and travels following the lane markings (refer for example to Japanese Patent Application Publication No. Hei7-104850 (hereinafter "Patent Reference 1"), etc.) have also been progressing.

The first lane keeping assistance devices mostly accomplished automatic lane keeping assistance controls, so that the vehicles advanced at the middle of the driving lane, as well as along the center line within the traffic lane indicated at the vehicle's left-right. Such devices are similar to the one mentioned in Patent Reference 1.

However, the driver may want to travel while approaching the right or the left of the driving lane. In such a case, if the lane keeping assistance device automatically controls to follow the middle of the driving lane, discomfort may arise, and troublesomeness may be experienced.

A lane keeping assistance device is mentioned in Japanese Patent Application Publication No. 2001-39326 (hereinafter "Patent Reference 2") with the aim of solving such a problem. Patent Reference 2 proposes a device so that, at traveling times when the device's lane keeping assistance control is not in operation, the lateral displacement data for the vehicle position in the sideways direction of the driving lane is collected. Then, the device learns the position of a driving lane which fits the driver's preference.

Additionally, Japanese Patent Application Publication No. 2004-231096 (hereinafter "Patent Reference 3") proposes a lane keeping assistance device which establishes a target line which reflects the driver's preference based on the lateral displacement data collected using the above technique. The device makes the vehicle follow this target line.

However, with the lane keeping assistance device mentioned in Patent Reference 3, the target line cannot be changed when the driver is revising the vehicle's travel orbit by steering with the steering wheel. There are cases when discomfort arises at the driver's steering with the steering wheel, because the vehicle is continuously dragged to the previous target line.

It is conceivable to temporarily stop the lane keeping assistance control while the driver is steering with the steering wheel, in order to avoid the occurrence of such discomfort. However, then the function of the lane keeping assistance control is not exhibited. For example, if the driving lane curves, there is a possibility that the vehicle will stray from the lane markings.

SUMMARY OF THE INVENTION

The present invention takes into consideration the above-described circumstances. It has an objective of providing a vehicle's lane keeping assistance device which assists the driver in traveling while properly following the lane markings, without giving discomfort to the driver and without any accompanying temporary stoppage. For solving the above-described problems, a first aspect of the invention is a lane keeping assistance equipment loaded on an automotive vehicle having a response motion unit for controlling a steering of the automotive vehicle traveling on a traffic lane between lane markings, having a lane marking detecting means for detecting a lane marking location; a sideways distance detecting means for detecting, based on said lane marking location detected by said lane marking detecting means, a sideways distance between the lane marking location and the automotive vehicle; a control means for performing lane keeping controls by creating and setting a travel target point at a position apart from said lane marking location, and transmitting a signal to the response motion unit for the automotive vehicle to travel on the travel target point involved; an intervening steering act detecting means for detecting intervening steering acts by a driver driving the automotive vehicle; and a measuring means for measuring an elapsing time after said intervening steering detected by said intervening steering act detecting means, wherein said control means updates a distance amount between said travel target point and the lane marking location, in correspondence with changes in the distance between said lane marking location and the automotive vehicle, at a time period during a continuing intervening steering act by the driver and an elapsing of a prescribed time after the ending of the steering act, and after said prescribed time elapses, sets the distance amount to said updated distance amount at the end of the elapsing of the prescribed time.

A second aspect of the invention is the lane keeping assistance equipment of the first aspect, wherein said control means changes said prescribed time based on a road curvature.

A third aspect of the invention is the lane keeping assistance equipment of the second aspect, wherein said control means shortens said prescribed time based on said road curvature.

A fourth aspect of the invention is the lane keeping assistance equipment of the first aspect, wherein if a vehicle speed inputted from a vehicle sensor is greater than a predetermined threshold value, said prescribed time is shortened from when said vehicle speed is less than said threshold value.

A fifth aspect of the invention is the lane keeping assistance equipment of the first aspect, wherein if said updated distance amount is smaller than an prescribed distance set beforehand, as said travel target point approaches a left-right lane marking location, then if an intervention from a steering act by said driver is not being detected, said control means increases said distance amount and causes said travel target point to move in a direction toward a center of a driving lane.

A sixth aspect of the invention is the lane keeping assistance equipment of the fifth aspect, wherein the moving of said travel target point ends at the point in time when said distance amount becomes equal to said prescribed distance or at the point in time when the distance amount becomes greater than the prescribed distance.

A seventh aspect of the invention is the lane keeping assistance equipment of the fifth aspect, further having a wakefulness estimation means for estimating a wakefulness of the driver, wherein if a determination is made from an estimation result by said wakefulness estimation means that the driver's wakefulness is falling, then said control means increases said prescribed distance.

An eighth aspect of the invention is the lane keeping assistance equipment of the first aspect, wherein said intervening steering detecting means detects an intervening steering act by said driver at least at an occurrence of a steering torque inputted from a steering torque sensor exceeding a predetermined threshold value, or at the steering torque's being inputted continuously in excess of a predetermined continuation time period, or at a differential value of a steering angle of a steering wheel, inputted from a steering angle sensor, being in excess of a predetermined threshold value.

A ninth aspect of the invention is the lane keeping assistance equipment of the first aspect, wherein said sideways distance detecting means selects a lane marking location at one side of left-right lane marking locations, and detects the distance between the lane marking location and the automotive vehicle based on said lane marking location detected by the lane marking detecting means, and said control means sets the travel target point at a fixed distance frontward of the automotive vehicle, at a position separated only by said distance amount from the lane marking location at said one side, which was selected by said sideways distance detecting means.

A tenth aspect of the invention is the lane keeping equipment of the first aspect, wherein said sideways distance detecting means calculates a center of a driving lane based on said detected lane marking location, and detects a distance between said center of the driving lane and the automotive vehicle, and said control means calculates the center of the driving lane based on said lane marking location at a fixed distance frontward of the automotive vehicle, and sets the travel target point at a position separated only by said distance from said center of the driving lane to the automotive vehicle.

An eleventh aspect of the invention is the lane keeping assistance equipment of the first aspect, wherein said sideways distance detecting means calculates a width of a driving lane based on said detected lane marking location, and detects a ratio of distances to the lane marking location and the automotive vehicle regarding said driving lane width, and said control means calculates the distance amount from said lane marking location by applying said ratio to said driving lane width at a fixed distance frontward of the automotive vehicle, and sets the travel target point at a position separated from said lane marking location only by that specific calculated distance amount.

A twelfth aspect of the invention is the lane keeping assistance equipment of the first aspect, further having a solid object detecting means for detecting a solid object within a picked-up image, wherein if an existence of another vehicle at an adjacent driving lane, frontward of the automotive vehicle, is detected by said solid object detecting means, then said control means does not perform an updating of said distance amount in a direction toward said detected other vehicle.

A thirteenth aspect of the invention is the lane keeping assistance equipment of the first aspect, wherein if a lane marking location is not detected by said lane marking detecting means, or the automotive vehicle is turning right or turning left, or the automotive vehicle is moving to an adjacent driving lane through lane changing, then said control means interrupts the control actions of said lane keeping controls.

A fourteenth aspect of the invention is the lane keeping assistance equipment of the first aspect, wherein if an edge at the side of the automotive vehicle straying from the lane marking goes over the concerned lane marking by greater than a predetermined distance to the outside, then said control means interrupts the control actions of said lane keeping controls.

A fifteenth aspect of the invention is the lane keeping assistance equipment of the thirteenth aspect, wherein said control means re-starts the control actions of the lane keeping controls at the stage when, at the original driving lane or the entered driving lane, a space between the automotive vehicle's edge and the corresponding lane marking location becomes greater than a predetermined interval.

A sixteenth aspect of the invention is the lane keeping assistance equipment of the thirteenth aspect, wherein if the control actions of said lane keeping controls are interrupted, then at the re-starting time of the lane keeping controls, said control means sets as said distance amount the distance between lane marking location detected by said sideways distance detecting means and the automotive vehicle.

A seventeenth aspect of the invention is the lane keeping assistance equipment of the first aspect, wherein at a device activation time, said control means sets as said distance amount the distance between the lane marking location detected by the sideways distance detecting means and the automotive vehicle.

An eighteenth aspect of the invention is the lane keeping assistance equipment of the first aspect, wherein if there are excessive steering acts of the steering wheel, then said control means completely stops the control actions of said lane keeping controls.

A nineteenth aspect of the invention is the lane keeping assistance equipment of the first aspect, further having a wakefulness estimation means for estimating a wakefulness of the driver, wherein if a determination is made from an estimation result by said wakefulness estimation means that the driver's wakefulness is falling, then said control means sets said travel target point at a center of a driving lane.

According to the first aspect of the invention, as long as an intervening steering act by the driver is not detected, even when the distance between the automotive vehicle and the lane marking location fluctuates, the distance amount is not changed and is kept fixed at the distance between the travel target point and the lane marking location. Because of that, the automotive vehicle is controlled to run while aiming for the travel target point. Thus, it becomes possible to travel while reliably complying with the lane marking location.

Also, when the driver performs an intervening steering act with the aim of revising the vehicle's travel orbit within the driving lane, etc., then during the time period of the continuation of the intervening steering acts and the elapsing of a prescribed time after the ending of such intervening steering, the distance amount is updated in correspondence with fluctuations in distance between the lane marking location and the automotive vehicle. Therefore, even at the time of an intervening steering act, it is possible to continuously perform the control actions of the lane keeping controls without temporarily stopping them.

Additionally, the distance amount is updated in correspondence with changes in the distance between the lane marking location and the automotive vehicle. Thus, the sense of malaise felt by the driver when steering the steering wheel, as in the prior art, is reduced, and it is possible to smoothly perform corrections, etc. of the automotive vehicle's travel orbit.

According to the second aspect of the invention, when the road curvature is smaller than an established threshold value, for example, the prescribed time is updated to be shorter than when the road curvature exceeds the established threshold value. Thus, there is no need to temporarily stop the control actions of the lane keeping controls even when the driving lane is curved. Also, at the point when the intervening steering acts of the driver end, the lane keeping controls works to immediately set the distance amount as the distance between the lane marking location and the automotive vehicle, and to travel along the set travel target point.

For that reason, in addition to the effects of the above-mentioned aspects of the invention, it is possible to reliably prevent the automotive vehicle's straying from a curved lane marking, and to stably perform the lane keeping controls.

According to the third aspect of the invention, when the driving lane is curved, the prescribed time is shortened based on road curvature, and the distance amount is immediately set at the distance between the lane marking location and the automotive vehicle, at the point when the intervening steering acts by the driver finish. Consequently, in addition to the effects of each of the above-mentioned aspects of the invention, the control actions of the lane keeping controls need not be temporarily stopped, and it is possible to reliably prevent the straying of the automotive vehicle from a curved traffic lane.

According to the fourth aspect of the invention, if the automotive vehicle seems likely to stray from a lane marking, the higher the vehicle speed, the shorter the time until straying becomes. Thus, because the above-mentioned prescribed time is shortened and the distance amount is immediately set at the distance between the lane marking location and the automotive vehicle, controls are quickly worked to pull back the automotive vehicle into the driving lane. Accordingly, the effects of each of the above-mentioned aspects of the invention are exhibited even more efficiently.

According to the fifth aspect of the invention, if the automotive vehicle seems to be approaching the lane marking location of one side or crossing over the lane marking, the automotive vehicle is pulled back into the driving lane at the stage when intervening steering acts by the driver finish. Thus, in addition to the effects of each of the above-mentioned aspects of the invention, it is possible to evade contact or collisions with other vehicles traveling within an adjacent driving lane.

According to the sixth aspect of the invention, for the above-mentioned fifth aspect, if the pulling back is ended at the stage when the automotive vehicle is sufficiently pulled back to within the driving lane, then the driver can correct a travel orbit within the driving lane according to his personal preferences, as compared to, for example, when the vehicle is still being forcibly pulled back toward the center of the driving lane. Thus, the effects of each of the above-mentioned aspects can be even more efficiently exhibited.

According to the seventh aspect of the invention, in addition to the effects of each of the above-mentioned aspects, if the driver's wakefulness is determined to be falling by the wakefulness estimation means, then the prescribed distance is increased. Therefore, contacts or collisions with other vehicles can be reliably evaded.

According to the eighth aspect of the invention, if a steering torque that exceeds a predetermined threshold value is inputted from the steering torque sensor, or if the steering torque continues to be inputted for longer than a predetermined continuation time, or if the differential value of the steering wheel's steering angle, inputted from the steering angle sensor, exceeds a predetermined threshold value, then an intervening steering act by the driver is determined to have occurred. Thus, the driver's intent can be accurately understood, and the effects of each of the above-mentioned aspects of the invention can be even more efficiently exhibited.

According to the ninth aspect of the invention, out of the left-right lane marking locations, for example, the side having the highest degree of parallelism with the automotive vehicle's travel path or the side closest to the automotive vehicle, or the one side having its position detected the most distantly, etc. can have its lane marking location as the standard, for detecting the distance between the lane marking location and the automotive vehicle. Because the travel target point is set at a location separated by only the distance amount from that side's lane marking location, if the road width widens or narrows, the automotive vehicle can reliably follow that above-mentioned one side's lane marking. Consequently, the effects of each of the above-mentioned aspects can be properly exhibited.

According to the tenth aspect of the invention, the distance from the lane marking location to the automotive vehicle is detected with the center of the driving lane as the standard, and the travel target point is set at a position separated by only the distance from the driving lane's center to the automotive vehicle. Thus, the automotive vehicle can reliably follow the lane marking even if the road width widens or narrows, and the effects of the above-mentioned aspects can be properly exhibited.

According to the eleventh aspect of the invention, a ratio of the distance between the lane marking location and the automotive vehicle, to the road width is detected, and the travel target point is set at a location separated from the lane marking location by only the distance amount obtained from applying said ratio to the road width at a frontward location. Accordingly, even if the road width widens or narrows, the automotive vehicle can follow the lane marking location while traveling reliably within the driving lane, and the effects of the above-mentioned aspects can be properly exhibited.

According to the twelfth aspect of the invention, in addition to the effects of the above-mentioned aspects, if the existence of another vehicle frontward of the automotive vehicle in an adjacent lane is detected by the solid object detecting means, then the travel target point is not updated in a direction toward the other vehicle concerned. Thus, the automotive vehicle's colliding with the other concerned vehicle can be reliably evaded.

According to the thirteenth aspect of the invention, in addition to the effects of the above-mentioned aspects, if the lane marking detecting means could not detect the lane marking location during a fixed number of sampling cycles in a row, or if the automotive vehicle is turning left-right, or if the automotive vehicle is moving to an adjacent lane due to a lane change, as examples, then the control actions of the lane keeping controls are interrupted. Consequently, one can prevent the occurrence of situations such as disturbing the driver's steering of the steering wheel to correct the guidance of the automotive vehicle in the wrong direction or back to the original driving lane, due to the performance of the control actions of the lane keeping controls based on travel target points established at the wrong positions or unreliable travel target points. Thus, the driver can correspond appropriately.

According to the fourteenth aspect of the invention, if the automotive vehicle's edge on the side that is straying from the lane marking location crosses to the outside of the concerned lane marking by greater than a fixed distance, then the control actions of the lane keeping controls are interrupted until the driving lane that the automotive vehicle will travel is decided. In this way, the disturbing of the steering acts of the driver can be evaded, and the effects of each of the above-mentioned aspects can be properly exhibited.

According to the fifteenth aspect of the invention, the control actions of the lane keeping controls are re-started at the state when the automotive vehicle has sufficiently entered the original driving lane or the adjacent driving lane. Thus, the control actions of the lane keeping controls can be re-started at the driving lane selected by the driver to travel in, and the effects of each of the above-mentioned aspects can be properly exhibited.

According to the sixteenth aspect of the invention, if the control actions of the lane keeping controls are interrupted, the distance amount is set as the distance between the lane marking location and the automotive vehicle at the re-starting time of the lane keeping controls. Accordingly, the location of the travel target point is specified and the lane keeping controls is reliably performed. Also, when the current distance between the lane marking location and the automotive vehicle is already the distance preferred by the driver, there is no need for later corrections of the travel orbit within the driving lane. This allows the effects of each of the above-mentioned aspects to be even more efficiently exhibited, as compared to when, for example, the travel target point is forcibly set at the driving lane's center, etc.

According to the seventeenth aspect of the invention, at a device activation time, the distance amount is set as the distance between the lane marking location and the automotive vehicle, so that the lane keeping controls is reliably performed because the location of the travel target point has been specified. Also, if the current distance between the lane marking location and the automotive vehicle is already a distance preferred by the driver, there is no need to later correct a travel orbit within the driving lane. Thus, the effects of each of the above-mentioned aspects can be even more efficiently exhibited, as compared to when, for example, the travel target point is forcibly set at the driving lane's center, etc.

According to the eighteenth aspect of the invention, in addition to the effects of each of the above-mentioned aspects, if there are excessive steering acts on the steering wheel by the driver, it is determined that the driver has performed sudden steering of the steering wheel to avoid danger, etc. In such cases, the automotive vehicle is not made to follow the lane marking, and the driver can deal with such cases appropriately. Thus, the occurrence of accidents, etc. can be evaded, and the driver's safety can be ensured.

According to the nineteenth aspect of the invention, in addition to the effects of each of the above-mentioned aspects, if it is determined by the wakefulness estimation means that the driver's wakefulness is falling, the travel target point is set at the center of the driving lane. This is based on the fail-safe way of thinking, and the automotive vehicle is pulled back to the middle of the driving lane, so that contact or collisions with other vehicles can be reliably evaded.

DETAILED DESCRIPTION OF THE INVENTION

Figure 1:
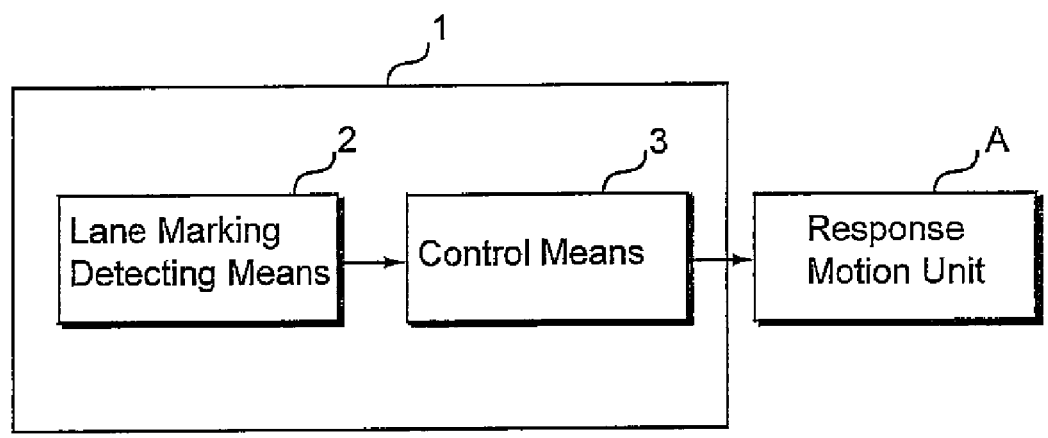
FIG. 1 is a block diagram showing a configuration of a lane keeping assistance equipment of the present embodiment.

The following describes a preferred embodiment of the traffic lane keeping assistance device of the present invention, while referring to the drawings.

The lane keeping assistance device 1 of the present embodiment is equipped with, as shown in FIG. 1, a lane marking detecting means 2 and a control means 3. Additionally, a response motion unit A, that includes a control system having a steering servo function, is connected to the control means 3. The control means 3 is made so that it accomplishes the lane keeping controls by transmitting signals to the response motion unit A.

In the present embodiment, the detecting means 26 of the lane marking detecting means 2 as well as the control means 3 comprise a microcomputer where a CPU, ROM, RAM, input-output interface, etc. are connected to a bus and are not shown in the drawings.

The lane marking detecting means 2 is one that can detect a lane marking from a picked-up image obtained by imaging the travel path, including the road, of a vehicle. The means for the lane marking detection is not limited to specific means. In the present embodiment, the lane marking detecting means 2 is configured based on the lane marking recognition device mentioned in Japanese Patent Application Publication No. 2001-92970. A detailed description of that configuration is left to that same publication, but the configuration is explained simply below.

In addition, the lane marking in the present invention means the solid and broken lines marked on the road surface, for the road median lines of the no-passing lines, etc., vehicular lane boundary lines, dividing lines for dividing the roadway from the road shoulder zones, etc. Furthermore, the driving lane means the vehicle passing region at the space between a lane marking and a lane marking, where the vehicle travels.

Figure 2:
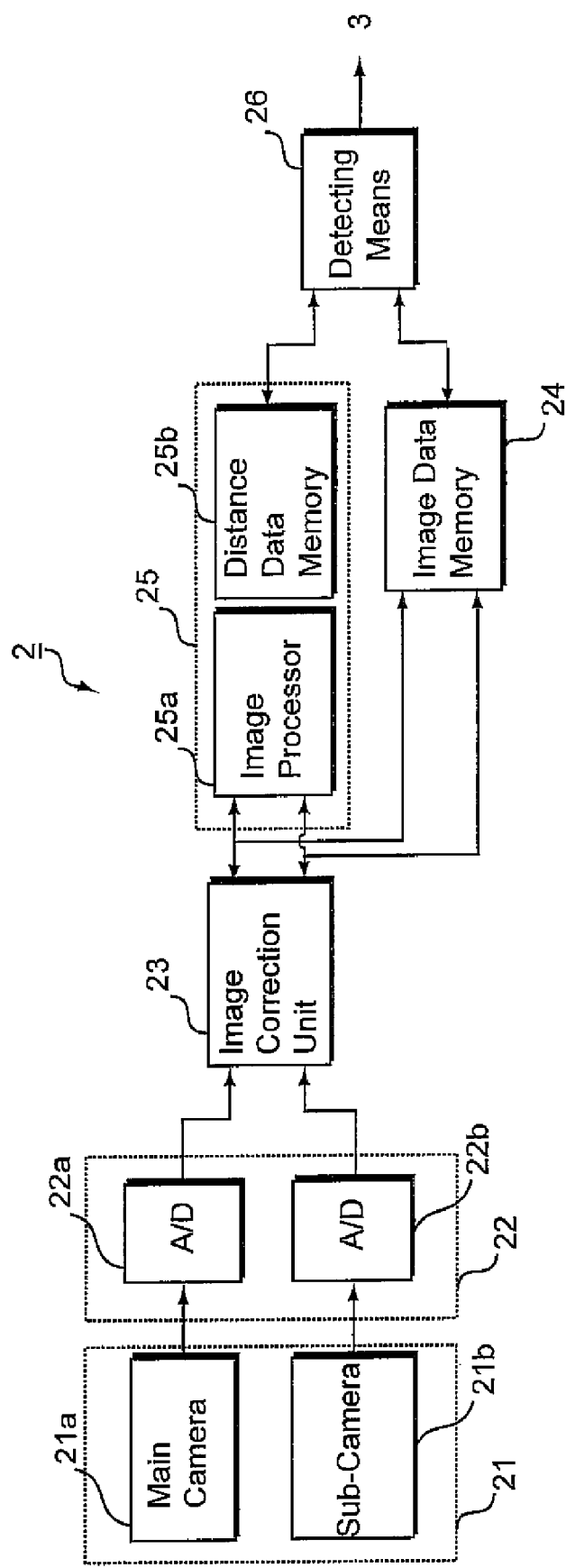
FIG. 2 is a block diagram showing a configuration of a lane marking detecting means of the present embodiment.

The lane marking detecting means 2 is, as shown in FIG. 2, configured mainly by an image pick-up means 21, a changing means 22, an image processing means 25, and a detecting means 26.

Figure 3:
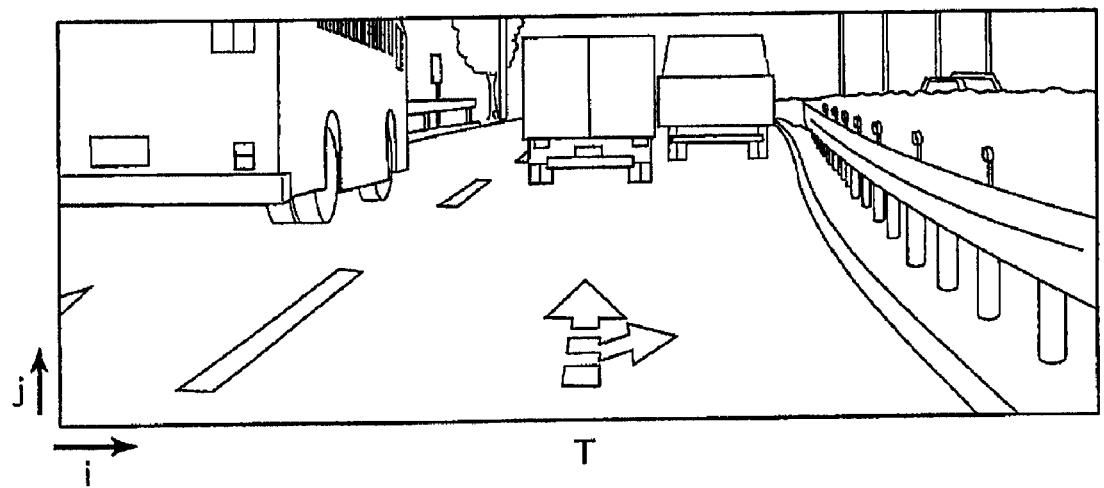
FIG. 3 is an illustration showing one example of a standard image.

The image pick-up means 21 is configured so that stereoscopic cameras are used to pick-up images of the vehicle's travel path, including the road, and a pair of images are output. In the present embodiment, CCD (Charge Coupled Device) cameras are used in the main camera 21a, as well as in the sub-camera 21b. The main camera 21a and the subcamera 2b are installed, for example, at the room mirror with a fixed interval between them in the lateral direction. The camera closer to the driver picks up the standard image T as shown in FIG. 3, and is the main camera 21a. The more distant camera picks up the comparison image, not illustrated in the drawings, and is the sub-camera 21b.

The pair of analog images outputted from the main camera 21a and the sub-camera 2b are converted, by the A/D converters 22a, 22b at the changing means 22, to digital images having brightness values for the brightness intensities of the 256 intensities grayscale, for each and every picture element. The digital images are then outputted to an image correction unit 23.

The image correction unit 23 accomplishes image corrections for correcting the brightness levels, etc., including the differences between the standard image T and the comparison image originating from the gap in installation positions between the main camera 21a and the sub-camera 21b, or the removal of noise, etc. The standard image T and the comparison image are stored in the image data memory 24 and are, at the same time, transmitted to the image processing means 25.

The image processor 25a of the image processing means 25 calculates the parallax error dp for calculating the distances in real space for each established region from blocks. These blocks comprise each picture element or plural picture elements of the standard image T, based on the digital data of the standard image T and the comparison image outputted from the image correction unit 23, through stereo matching processing and filtering processing. This calculation of the parallax error dp is explained in detail in Japanese Patent Application Publication No. Hei 5-114099, previously submitted by the present applicant. Below, this point is described simply.

The image processor 25a calculates a single parallax error dp, based on the brightness characteristics of the 16 picture elements blocks, from each picture element block of 4×4 picture elements, at the standard image T. To put it concretely, the comparison image is divided into horizontal lines, extending horizontally, of 4 picture element widths. Then, a single picture element block of the standard image T is taken out, and one shifts horizontally by one picture element at a time, along the corresponding line of the comparison image. In other words, one shifts in the i direction while searching for the picture element block at a horizontal line having a minimum of a city-block distance CB, as acquired from the below formula (1), namely, the picture element block of the comparison image having similar brightness characteristics to the picture element block of the standard image.

$$CB = \Sigma |p1ij - p2ij| \quad (1)$$

In addition, $p1ij$ expresses the brightness value of the picture element at coordinate (i, j) of the standard image T, and $p2ij$ expresses the brightness value of the picture element at coordinate (i, j) of the comparison image. The coordinates express the i coordinate and the j coordinate at the lower-left corner of the picture element block, in the case where the lower-left corner of the image plane of the standard image T is made to be the origin, and the horizontal direction is the i coordinate axis and the vertical direction is the j coordinate axis. For the comparison image, the i coordinate and the j coordinate are taken similarly, having the origin as the picture element that was corresponded beforehand to the origin of the standard image T.

In this manner, the image processor 25a calculates the difference amount between the picture element block at the base standard image T and the specified picture element block at the comparison image.

This parallax error dp is the relative difference amount in the horizontal direction, originating from the separation gap of a fixed distance between the above-mentioned main camera 21a and the sub-camera 21b, relating to the mapping locations of the identical object at the standard image T and the comparison image. The distance L from the centers of the main camera 21a and the sub-camera 21b to the object, and the parallax error dp, can be unmistakably corresponded based on the principle of trigonometrical measurement.

The distance L based on the parallax errors dp of each picture element block of the standard image T, which is calculated at the image processor 25a, is stored at the distance data memory 25b of the image processing means 25. In the following handlings at the detecting means 26, the 16 picture elements that were originally one picture element block are handled separately, and every picture element is processed so that each has information for the distance L. Additionally, the mapping for the allotment of the distance Lij to each picture element (i, j), that is stored in the distance data memory 25b, is called the distance image.

It is also possible to configure the below processing at the detecting means 26, so that the handling is done with the picture element block left as is, rather than with the picture element block dealt with as 16 independent pieces.

The detecting means 26 reads from the image data memory 24 the information of brightness values $p1ij$ for each picture element of the standard image T, and also, reads from the distance data memory 25b the information of distances Lij for each picture element of the distance image. Based on those, the detecting means 26 detects the lane marking in the image.

To put it more concretely, the detecting means 26 searches while offsetting one by one the picture elements at a horizontal line having a single picture element width in the standard image T. Based on the brightness values $p1ij$ of each picture element of the standard image T, the detecting means 26 detects the elements that satisfy the condition where each picture element's brightness differential value, or the edge intensities, vary greatly and exceed a threshold value, etc. At that time, based on the information of the distances Lij for each picture element, that has been allotted to the distance image corresponding to the standard image T, if the detected picture element is not at the road surface, then it is excluded.

Figure 4:
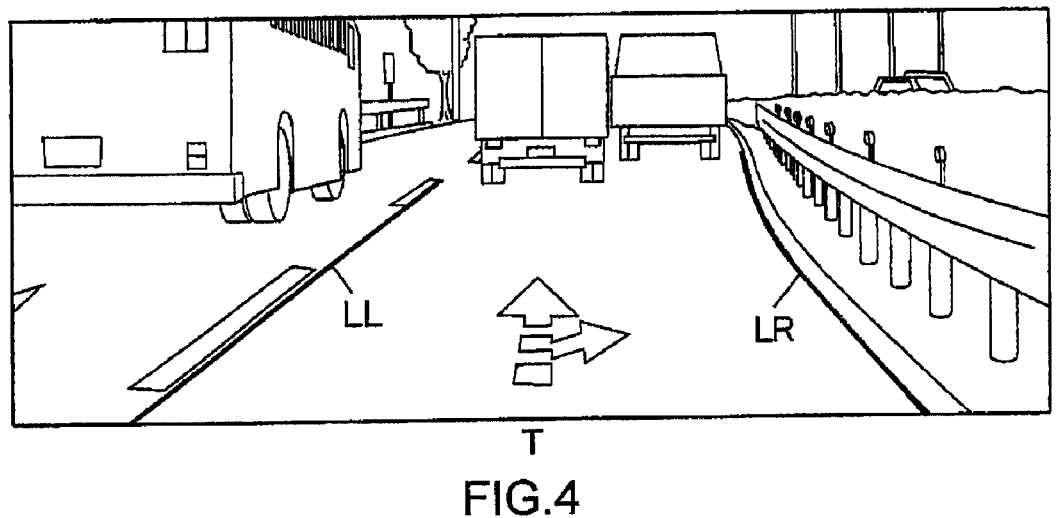
FIG. 4 is an illustration showing a right lane marking and a left lane marking detected at the standard image.

The detecting means 26 performs the detections of the sequential picture elements while offsetting one by one by the picture element widths from the bottom side of the standard image T toward the top, at the horizontal line at which the searching is being done. In this way, the detecting means 26 detects in the standard image T, each of the right lane marking location LR at the right side of the vehicle and the left lane marking location LL at the left side of the vehicle, as shown in FIG. 4. Furthermore, each lane marking in the standard image T is converted and its position in real space is recognized.

In addition, the detecting means 26 can group the detected picture elements by distances between picture elements or by direction. It can then detect and distinguish whether the lane marking is a marking expressed as a solid line for a passing prohibition line or for a sectioning line for sectioning between the road shoulder zone and the roadway, etc., or whether the lane marking is a marking expressed as a dashed line for a vehicle passing zone boundary line, etc. indicating the allowance of lane changes.

Furthermore, the searching of the picture elements is done with an established search area at the standard image T. In other words, a fixed scope at the standard image T, which includes the lane marking location based on the lane marking location detected at the previous detection handling, is set as the search area in the current detection handling. Also, as the detections are done at the sequential picture elements while offsetting one by one the horizontal lines of picture element widths from the bottom side of the standard image T toward the top, if at a certain horizontal line no picture element satisfying the above-mentioned conditions can be detected, then the search is conducted having a broadened search area at the next horizontal line.

The detecting means 26 outputs to the control means 3 information regarding the detected right lane marking location LR and the left lane marking location LL, etc.

Figure 5:
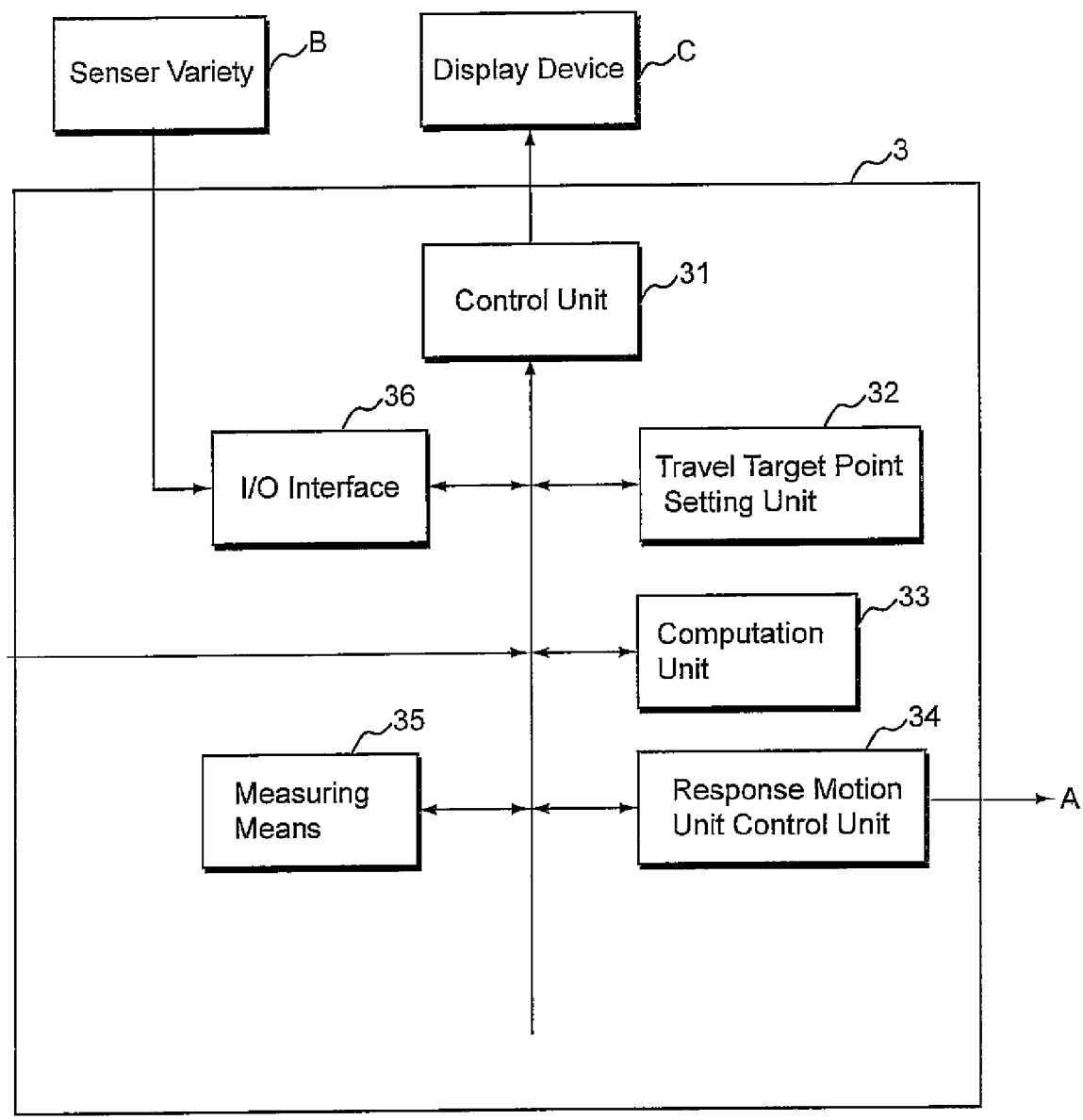
FIG. 5 is block diagram showing a configuration of a control means of the present embodiment.

The control means 3 is equipped with, as shown in FIG. 5, a control unit 31, a travel target point setting unit 32, a computation unit 33, a response motion unit control unit 34, and measuring means 35.

Additionally, the control unit 31 is connected via an I/O interface 36 to a sensor variety B such as a vehicle speed sensor, a steering torque sensor, a turn signal, etc. The control unit 31 inputs a vehicle speed V or a steering angle δ of the steering wheel, a steering torque TH applied to the steering wheel, or a signal TS from a turn signal, etc. from the sensor variety B.

The control unit 31 controls the action timing of each of the above-mentioned parts and the flow of information among each of the parts.

Figure 6A:
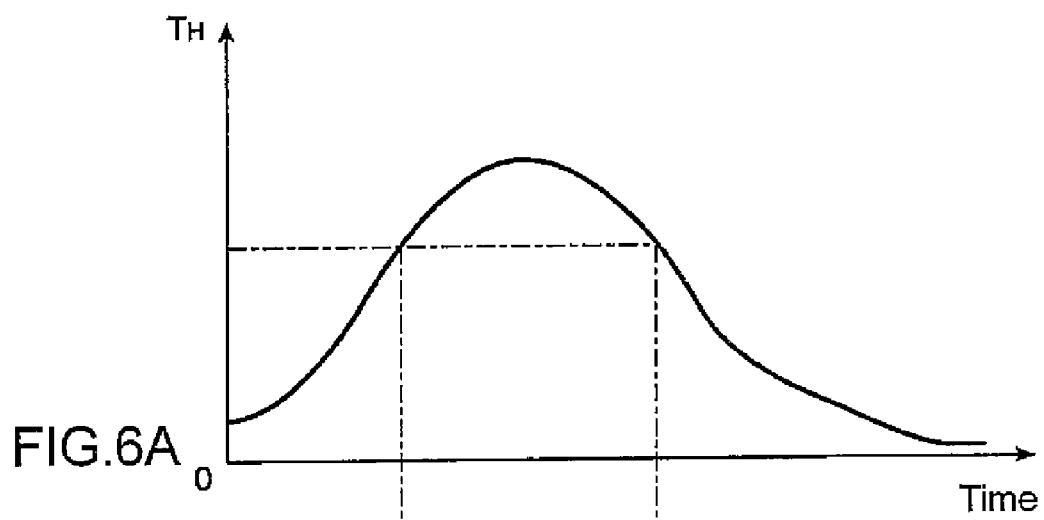
FIG. 6A is a graph showing an example of steering torque.

Additionally, the control unit 31 regularly watches the steering torque TH input from the steering torque sensor. As shown in FIG. 6A, when the steering torque TH exceeds a preset threshold value, the control unit 31 determines that there has been an intervening steering act by the driver. In other words, in the present embodiment, the control unit 31 is equivalent to an intervening steering detecting means for detecting an intervening steering act by the driver.

Furthermore, one can configure the determination of this intervening steering act by, for example, the differential value of the steering angle δ or the steering speed, or a continuous period of the steering torque TH being above a fixed value, etc. Also, it is also possible to make a determination with a combination of those, including having the set threshold value regarding the steering torque TH.

When the control unit 31 determines that an intervening steering act by the driver has occurred, a sampling cycle count suitable to an prescribed time T lap, set beforehand, is set at the counter at the measuring means 35. The prescribed time T lap is set to be suitable. For example, if the prescribed time T lap is set at 3 seconds, when 1 sampling cycle has a necessary time period of 100 milliseconds, the count is set at 30. When 1 sampling cycle has a necessary time period of 10 milliseconds, the count is set at 300.

Furthermore, when the count of the sampling cycle is set as equivalent to the prescribed time T lap, the control unit 31 subtracts by 1 each the count of the counter 35, for each 1 sampling cycle. Thus, the elapsed time is measured.

Figure 6B:
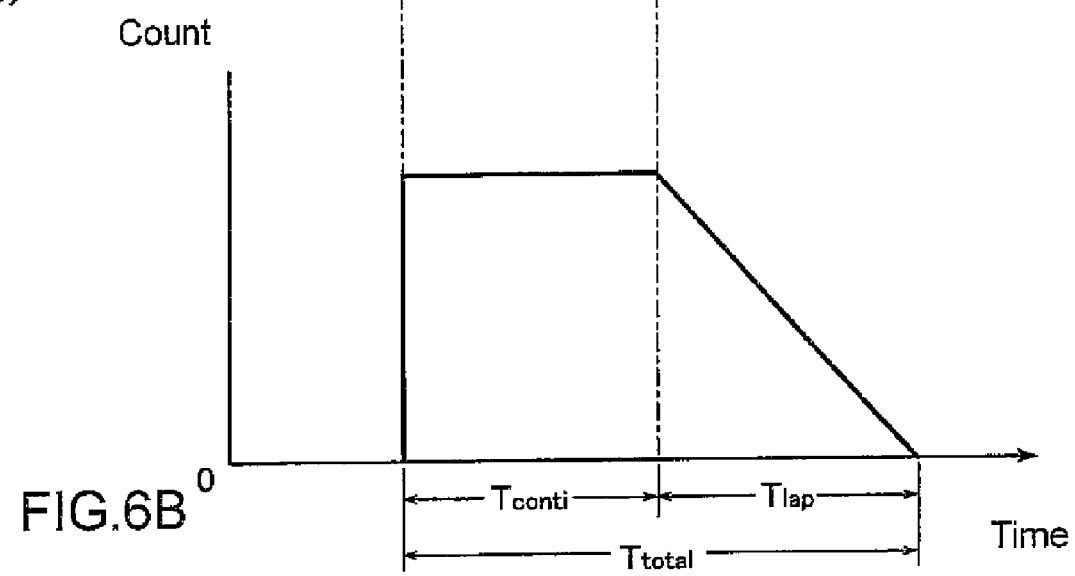
FIG. 6B is a graph showing the time change of the count of a measuring means.

However, as long as it is determined that there are intervening steering acts by the driver, for each and every sampling cycle the control unit 31 continues to set at the counter 35 the count of the sampling cycle count, which is suitable to the prescribed time T lap. Accordingly, as shown in FIG. 6B, the count at the counter 35 is maintained at a count that is equivalent to the prescribed time T lap, for as long as the intervening steering acts by the driver continue. And, the subtraction begins when the steering intervention disappears. Therefore, the measurement of the prescribed time T lap begins from the point when the steering intervention disappears.

In other words, in the continuing time T conti from the beginning of the intervening steering act and its continuation, and from the ending of the intervening steering act until the elapsing of the prescribed time T lap, which is the time period T total, the counter 35 has a condition of having a count set at a value greater than 0.

Figure 7:
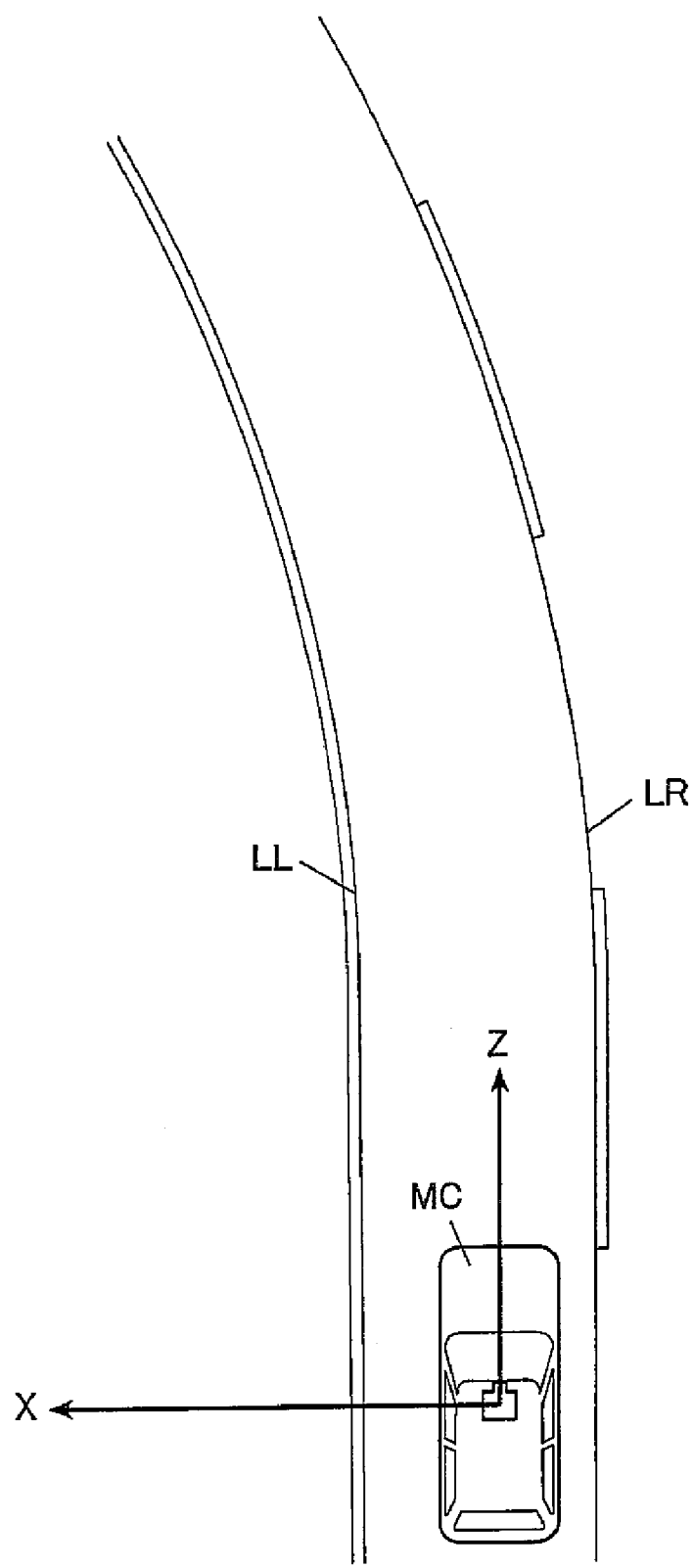
FIG. 7 is an illustration showing an automotive vehicle and lane marking locations arranged at a virtual real space.

Meanwhile, as shown in FIG. 7, the control unit 31 sets, virtually, a real space. At this real space, the control unit 31 arranges the automotive vehicle MC, and the right lane marking location LR and the left lane marking location LL, which were transmitted from the lane marking detecting means 2 based on information regarding the right lane marking location LR and the left lane marking location LL.

Then, as in FIG. 7, the origin is made to be a point on the road surface right under the center location for the main camera 2a and the sub-camera 2b. The traveling direction of the automotive vehicle is taken at the z axis, and the left-right direction vertical to the traveling direction is taken as the x axis. The curvature expressing the lane marking location is approximated as a second degree curve, that is, the math expression $x=az^2+bz+c$. The curvature at the position of the automotive vehicle is calculated as $1/2a$.

Still further, the approximation method of a second degree curve can also be obtained, for example, as the second degree curve which goes through 3 points, where those 3 points were sampled on the right lane marking location LR. The second degree curve can also be calculated through the least squares method by sampling several points on the right lane marking location LR.

Figure 8A:
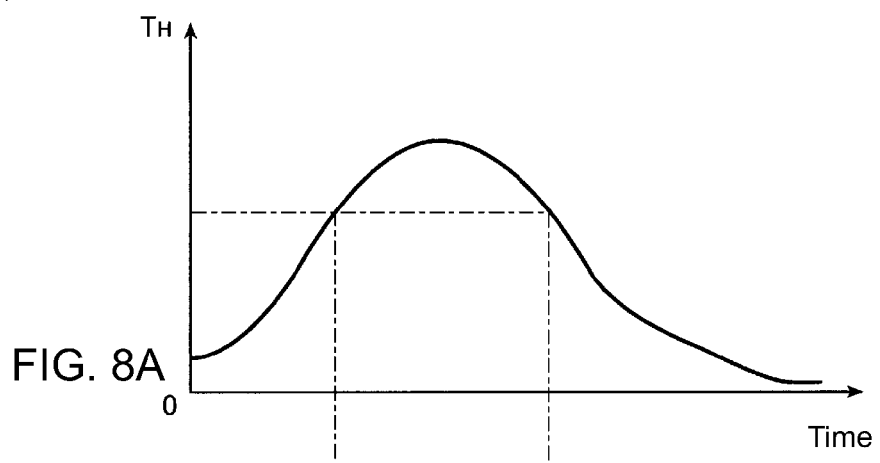
FIG. 8A is a graph showing an example of steering torque.
Figure 8B:
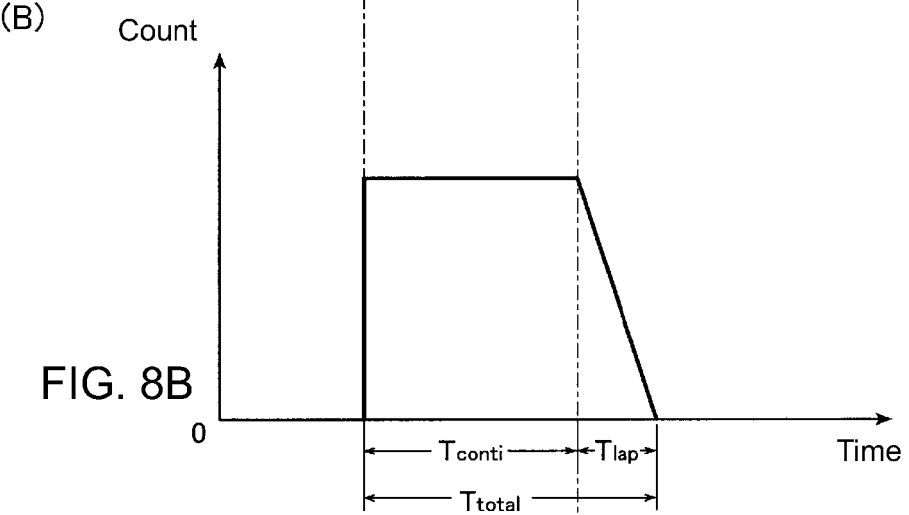
FIG. 8B is a graph showing the count of the measuring means when the prescribed time has been shortened.

If the calculated curvature of the road is smaller than a threshold value set beforehand, that is, if the driving lane is curved, the control unit 31 shortens the prescribed time T lap which is after the end of the intervention. In other words, as shown in FIG. 8A, if the steering torque TH exceeds a threshold value set beforehand, it is determined that there was an intervening steering act and that the intervening steering act is continuing. As shown in FIG. 8B, the counter 35 is set at the usual count. However, when it is determined that the intervening steering act by the driver is gone, the count at the counter 35 is greatly decreased and the prescribed time T lap is shortened.

Figure 8C:
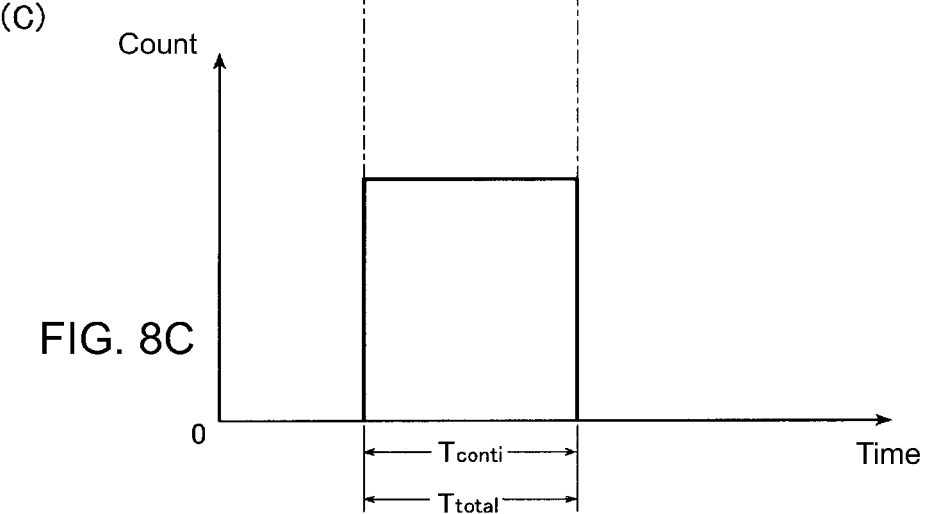
FIG. 8C is a graph showing the count of the measuring means when the prescribed time is made to be 0.

In the present embodiment, the prescribed time T lap is made to be 0. In that case, as shown in FIG. 8C, when the intervening steering act by the driver disappears, the count of the counter 35 instantly becomes 0. Also, when the calculated curvature of the road is smaller than a threshold value set beforehand, even if a determination is made that an intervening steering act by the driver exists, it is also possible, from the beginning, to avoid setting the count at the counter 35 to any value greater than 0.

Still, when the calculated curvature of the road is greater than the threshold value set beforehand, that is, when the driving lane is a straight line or close to a straight line, the prescribed time T lap is not shortened.

If the vehicle speed V inputted from the vehicle speed sensor is smaller than a fixed threshold value, as usual, after the intervening steering act by the driver ends, the control unit 31 subtracts by 1 each the count for the counter 35 for each 1 sampling cycle, similar to the case shown in FIG. 6B. However, if the vehicle speed V inputted from the vehicle speed sensor is greater than the fixed threshold value, after the end of the intervention, the control unit 31 shortens the prescribed time T lap, similar to the case shown in FIG. 8B. This is because when the automotive vehicle MC seems likely to stray from the lane marking, the time until such straying is shorter if the vehicle speed V is greater.

Additionally, a display device C equipped with a monitor screen or speakers, etc. is connected to the control unit 31. If the count of the counter 35 is greater than 0, the control unit 31 transmits a signal to the display device C to display the effect of renewing a below-described travel target point and notify the driver via sound.

Figure 9:
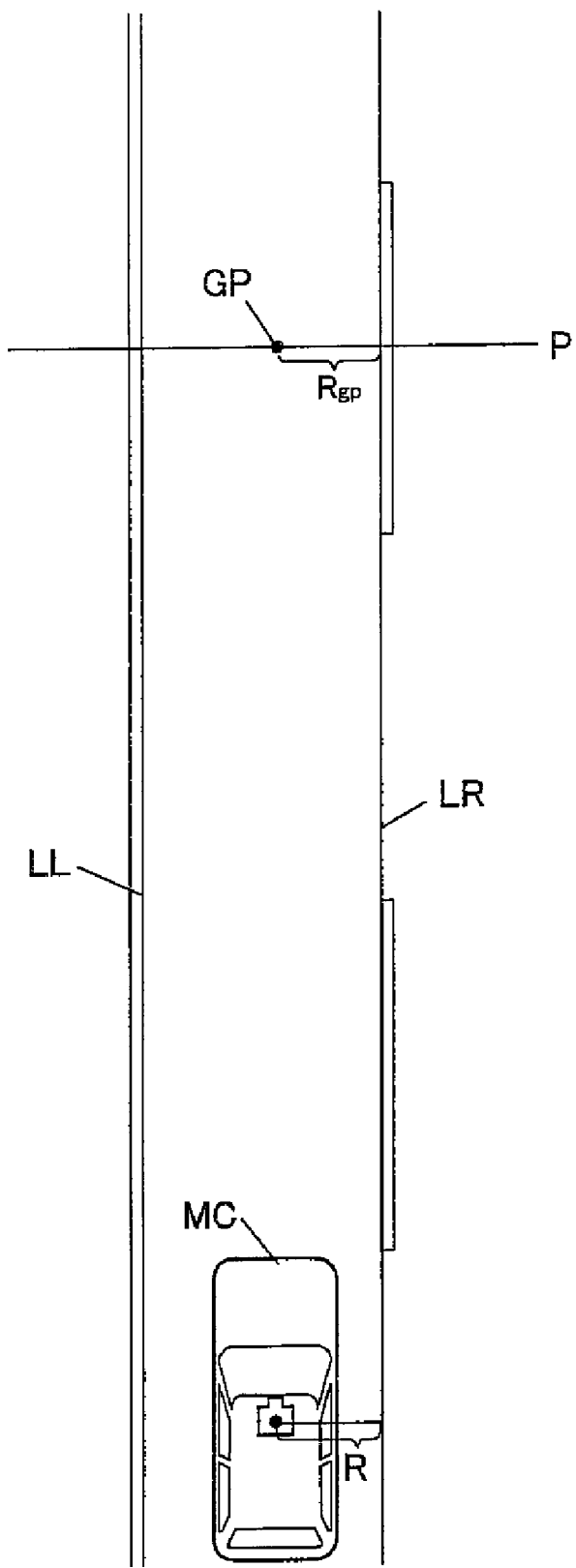
FIG. 9 is an illustration showing a distance amount, being set as a distance between a detected lane marking location and the automotive vehicle.

Based on the arrangement of the automotive vehicle MC and the lane marking locations LR, LL, which were set, virtually, in real space by the control unit 31, the travel target point setting unit 32 detects the distance R between a lane marking location and the automotive vehicle MC, as shown in FIG. 9. In other words, in the present embodiment, the travel target point setting unit 32 is equivalent to a sideways distance detecting means. Also, in the present embodiment, the distance R is detected with the right lane marking location LR as the standard.

Furthermore, at a spot P separated from the front of the automotive vehicle MC by a fixed distance, the travel target point setting unit 32 creates and sets, at a position separated from the lane marking location by only a distance amount Rgp, a travel target point GP where the automotive vehicle MC should travel. In the present embodiment, the spot P separated by a fixed distance is set only as a frontward spot at a distance resulting from adding a fixed distance to a traveling distance, when the automotive vehicle MC travels for a fixed time at the present speed V.

Figure 10:
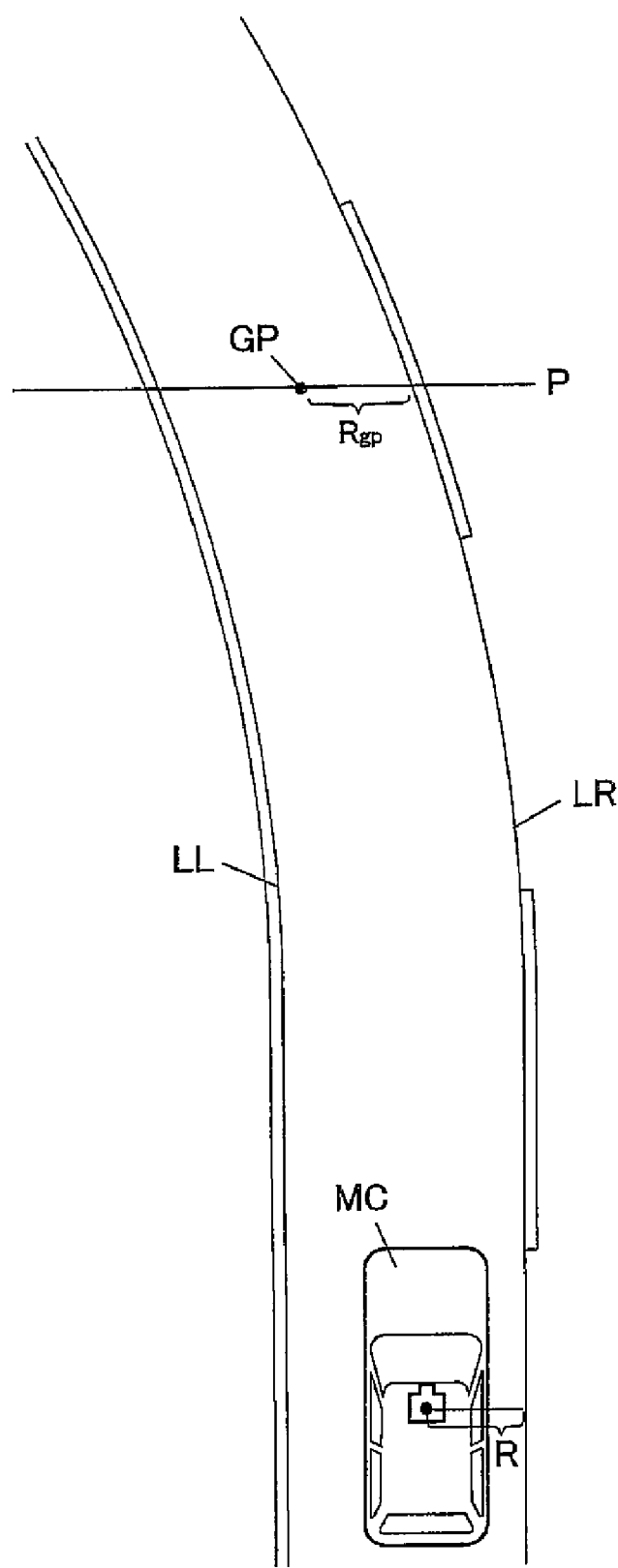
FIG. 10 is an illustration showing the distance amount, being set as a distance between a detected lane marking location and the automotive vehicle when the driving lane is curved.

Additionally, if the detected lane marking locations LR, LL are curved, in a similar fashion, the distance R between the lane marking locations and the automotive vehicle MC are detected. At the spot P, only the position separated from the lane marking location by an offset distance of Rgp is set as the travel target point GP, as shown in FIG. 10.

When resuming control after the lane keeping controls is interrupted due to a device activation time or any of the causes described below, the travel target point setting unit 32 sets as the distance amount Rgp, the present distance R between the right lane marking location LR and the automotive vehicle MC. In other words, in such a case, at the spot P frontward of the automotive vehicle MC and separated only by a fixed distance from the automotive vehicle MC, the travel target point GP is set at only the location separated by the present distance R between the right lane marking location LR and the automotive vehicle MC.

Also, if the above-mentioned count of the counter 35 is 0, that is, the control unit 31 is not detecting an intervening steering act by the driver, then the travel target point setting unit 32 does not renew the offset distance Rgp that has been established. In other words, even if the automotive vehicle MC moves left-right and the distance R changes, as long as an intervening steering act by the driver is not detected, the distance amount Rgp remains fixed at the established value and does not change.

On the other hand, if the above-mentioned count of the counter 35 is not 0, that is, at the time period T total which is the time period from within the continuing intervening steering act by the driver as well as from after the ending of the intervening steering act, to the elapsing of the prescribed time, then for each and every sampling cycle, the travel target point setting unit 32 sets the distance amount Rgp as the value of the distance R from the lane marking location to the automotive vehicle MC at that sampling cycle. In other words, the distance amount Rgp is updated in correspondence with changes in the distance R between the lane marking location and the automotive vehicle MC.

Then, if the above-mentioned time period T total elapses, then the distance amount Rgp is set at the same value as the updated distance amount, that is, the final distance R between the lane marking location and the automotive vehicle MC, at the time of the time period's expiration.

Figure 11:
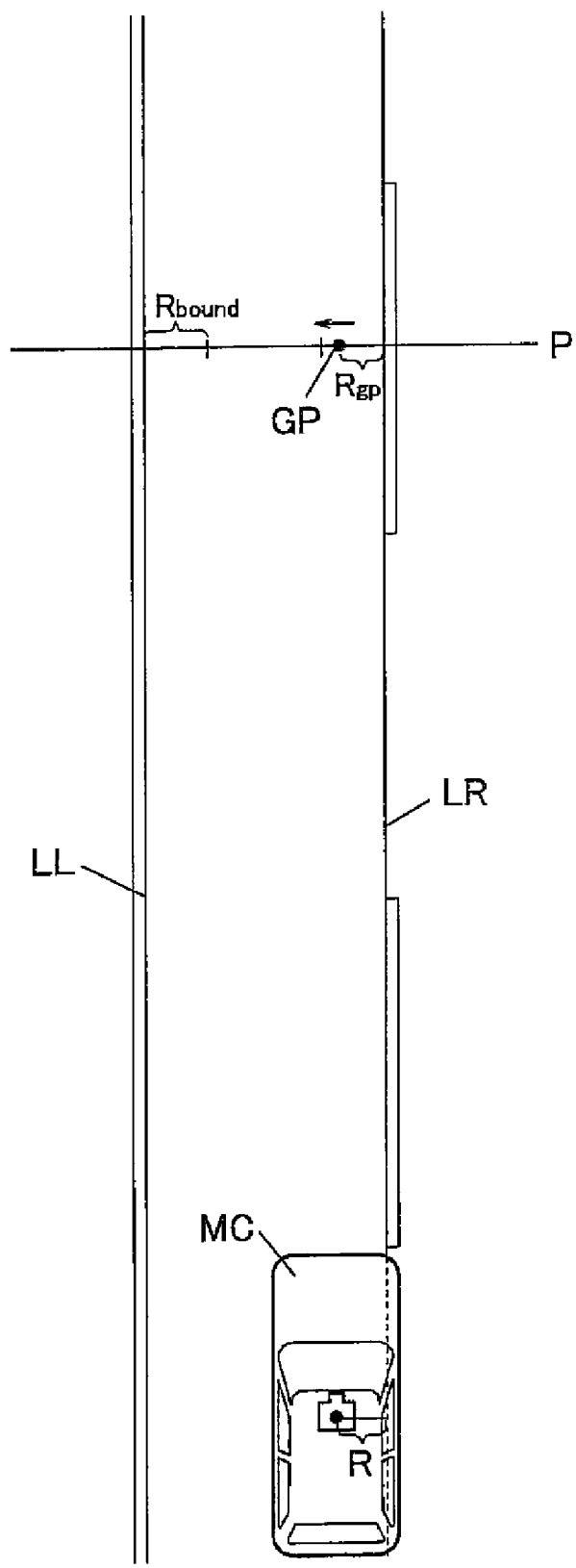
FIG. 11 is an illustration explaining when the distance amount is smaller than a prescribed distance.

Also, if the updated offset distance Rgp approaches the left-right lane marking locations at less than the prescribed distance Rbound which was set beforehand, then for each and every sampling cycle the travel target point setting unit 32 increases the distance amount Rgp by a fixed distance, for as long as the control unit is not detecting an intervening steering act, as shown in FIG. 11. The travel target point setting unit 32 moves the travel target point GP in the direction facing the center of the driving lane, as shown by the arrow in the drawing.

The above-mentioned movement of the travel target point GP finishes at the time when the distance amount Rgp equals the prescribed distance Rbound or when Rgp becomes greater than the prescribed distance Rbound. The distance to increase the distance amount Rgp for each and every sampling cycle, namely, the moving distance for each and every sampling cycle, is set appropriately.

Figure 12:
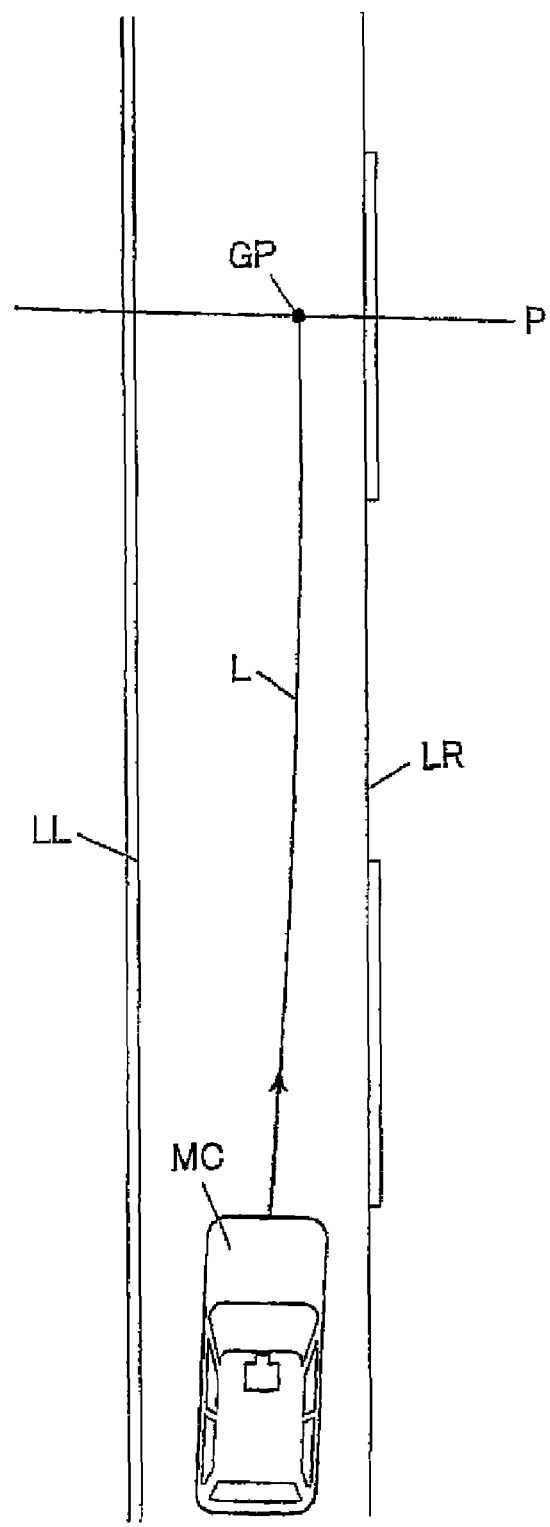
FIG. 12 is an illustration showing a driving line that has been determined.

When the travel target point GP is set via the travel target point setting unit 32, the computation unit 33 supposes an arc in the route where the automotive vehicle MC faces the travel target point GP, and determines the automotive vehicle's driving line L, as shown in FIG. 12. Then, a radius of the driving line L is calculated as the target radius r, from the position of the travel target1 point GP in the automotive vehicle's running direction and the spot P, as shown by the arrow in the drawing. Furthermore, the above-mentioned arc includes cases where the target radius r is infinite, or a straight line.

Also, the computation unit 33 calculates a target steering angle $\delta est$ for realizing the target radius, based on the calculated target radius r of the traveling line L, the vehicle speed V and the automotive vehicle's vehicle characteristic parameters.

The response motion unit control unit 34 calculates a vehicle body slip angle $\beta$ from the steering angle's measured value $\delta$ which is for example measured by the steering angle sensor based on a two-wheel aspect, that is, from the real steering angle $\delta re$, the vehicle speed V and the automotive vehicle's vehicle characteristics parameters.

The response motion unit control unit 34 successively calculates a self-aligning torque Tsa, based on a yaw rate $\gamma$, which is estimated or measured by a yaw rate estimation device or a yaw rate sensor, the above-mentioned vehicle body slip angle $\beta$, the real steering angle $\delta re$, the vehicle speed V and the vehicle characteristics parameters. Then, the calculated self-aligning torque Tsa is multiplied by a gain value, and the first electric power steering indicating torque current It1 is calculated.

Furthermore, the response motion unit control unit 34 calculates via PD control a second electric power steering indicating torque current It2, so that the real steering angle $\delta re$ measured by the steering angle sensor becomes a target steering angle $\delta est$ calculated by the computation unit 33. The response motion unit control unit 34 adds that to the above-mentioned electric power steering indicating torque current It1 and calculates a control indicating torque current It.

The response motion unit control unit 34 transmits as a signal the control indicating torque current It calculated in this manner so that the automotive vehicle travels along the driving line L, to the control system having a steering servo function at the response motion unit A. The control system having the steering servo function, based on the transmitted value of the control indicating torque current It, causes a control indicating torque current to occur. The electric power steering is then steered automatically.

In addition, the calculation of the target steering angle δest by the computation unit 33 and the calculation of the control indicating torque current It by the response motion unit control unit 34 are done for each and every sampling cycle.

At this point, cases where the control actions of lane keeping controls are interrupted will be explained. In the present invention, when the lane keeping control's control actions are interrupted, the above-mentioned distance amount Rgp is, in principle, in a yet to be calculated state.

When the lane marking locations LR, LL cannot be detected by the lane marking detecting means 2 and information regarding the lane marking locations LR, LL have not been transmitted, the control unit 31 interrupts the control actions of the lane keeping controls. This is based on a fail-safe way of thinking.

However, even if for some reason the lane marking detecting means 2 for example did not detect the lane marking location for just 1 sampling cycle, the control unit 31 may interrupt the control action of the lane keeping controls. The travel target point setting unit 32 can set, based on the lane marking location detected in the following sampling cycle, as the distance amount Rgp the current distance between the automotive vehicle MC and the right lane marking location LR. Thus, the lane keeping controls may not function sufficiently well. Therefore, a configuration is possible where the lane marking detecting means 2 interrupts the control actions of the lane keeping controls in cases where the lane marking locations LR, LL could not be continuously detected for a fixed number of sampling cycles.

Also, the control unit 31 will interrupt the control actions of the lane keeping controls in cases where the vehicle is turning right or turning left. The determination of whether or not the automotive vehicle is in the midst of turning right-left can be made, for example, through the inputting of signals TS from the turn signals.

In addition, even when the signals TS of the turn signals are not inputted, for example, if a condition where the steering wheel's steering angle δ inputted by the steering angle sensor exceeds 90° continues for more than 1 second, and the vehicle speed during that time is less than 40 km per hour, then the control unit 31 can determine that the automotive vehicle is in the midst of a right turn or a left turn.

One interrupts the control actions of the lane keeping controls in this manner because at crossings, etc. the lane markings may not be marked on the road or various markings may be mistakenly detected as lane markings, and a wrong position can be set as the travel target point GP, so that unnecessary torque is added to the steering wheel and the steering can become unstable.

Furthermore, the control unit 31 interrupts the control actions of the lane keeping controls if the automotive vehicle moves to an adjacent driving lane due to a lane change. The determination of whether or not the automotive vehicle is changing lanes can be made, for example, through the inputting of signals TS from the turn signals.

Additionally, even when the signals TS of turn signals are not inputted, for example, if in a condition where intervening steering acts by the driver are detected and the automotive vehicle goes over a lane marking location, that is, if the distance R between the lane marking location and the automotive vehicle becomes 0, then the control unit 31 can make a determination of a lane change.

Figure 13:
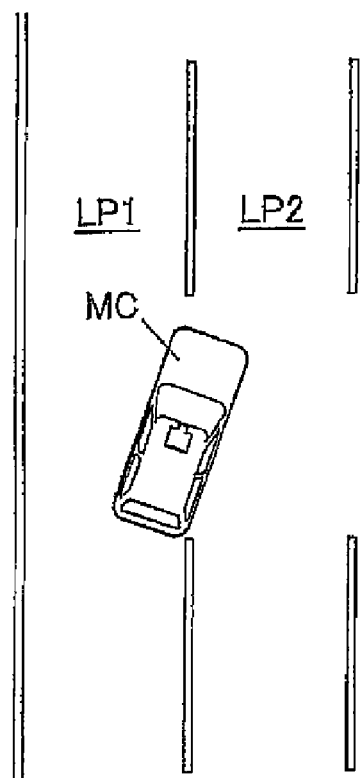
FIG. 13 is an illustration showing the automotive vehicle entering the next lane, due to a lane change.

As shown in FIG. 13, if the automotive vehicle is trying to change lanes from driving lane LP1 to driving lane LP2, if the lane keeping controls for the original lane LP1 is not cancelled, then the automotive vehicle may receive controls in the direction of pulling it back toward the driving lane LP1, due to the function of the updated distance amount Rgp going beyond the prescribed distance Rbound to pull back toward the inside, as illustrated in FIG. 11. Thus, the steering may become unstable.

Therefore, when the automotive vehicle is moving from an original driving LP1 to an adjacent driving lane LP2 due to a lane change, the control unit 31 interrupts the lane keeping controls for the original driving lane LP1. Once the automotive vehicle has moved to the driving lane LP2, the control actions for lane keeping controls at the new driving lane LP2 are re-started.

Figure 14:
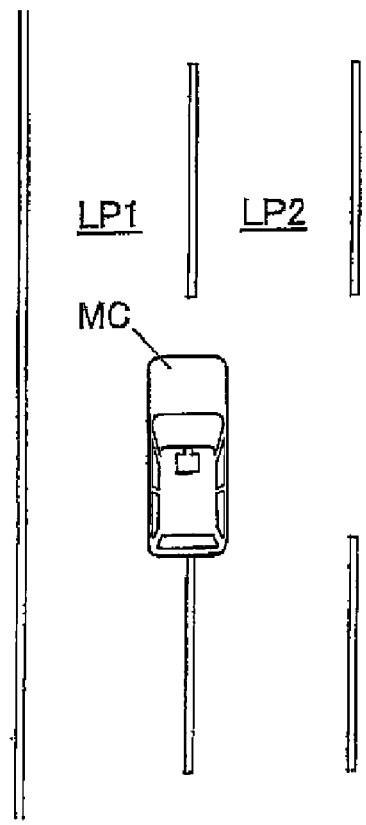
FIG. 14 is an illustration showing the automotive vehicle traveling while crossing over the lane marking.

Also, if the side of the automotive vehicle that strays from the lane marking goes over to the outside of the lane marking concerned by greater than a fixed distance, as shown in FIG. 14, then the control unit 31 interrupts the control actions of the lane keeping controls. This is because if the straying from the lane marking is due to the driver's intervening steering acts, then it is better to interrupt the control actions of the lane keeping controls, in order to avoid disturbing the driver's steering acts.

Also, when interrupting the control actions of the lane keeping controls in the above-mentioned manner, the control actions of the lane keeping controls are re-started at the stage where the automotive vehicle is sufficiently inside the original lane or adjacent lane. That is, they are re-started at the stage when a space between the automotive vehicle's edge and a corresponding lane marking location exceeds a fixed space. In the present embodiment, as an example, the control actions of the lane keeping controls are re-started at the stage when the automotive vehicle has entered inside the lane marking location by the amount of 20 cm, which is equal to one tire's width portion.

Furthermore, if there are excessive steering acts, namely, if the differential value of the steering angle δ for the steering wheel, inputted from the steering angle sensor, or if the steering torque TH applied to the steering wheel inputted from the steering torque sensor, go over their respectively established threshold values, then the control unit 31 completely stops the control actions of the lane keeping controls and returns to an initial condition. This is because if the driver does a sudden steering of the steering wheel to avoid danger, etc., it is better to not perform lane keeping controls. Also, the threshold value for determining excessive steering acts is set at greater than the threshold value for determining intervening steering acts by the driver.

Next, the operations of the lane keeping assistance equipment 1 of the present embodiment are explained.

Because the functions of the lane marking detecting means 2 which make up the lane keeping assistance equipment 1 have been stated in the above-described configuration, such explanation will be omitted.

At the control means 3 of the lane keeping assistance equipment 1, based on information transmitted at the control unit 31 from the lane marking detecting means 2, the right lane marking location LR and the left lane marking location LL and the automotive vehicle are arranged in virtual real space, for each and every sampling cycle. At the travel target point setting unit 32, the travel target point GP is created and set, based on the lane marking locations and the distance amount Rgp.

Additionally, at the computation unit 33, the automotive vehicle's driving line L is decided from the travel target point GP and the automotive vehicle's running direction, for each and every sampling cycle. The control indicating torque current It is calculated by the response motion unit control unit 34, and based on that, the response motion unit A accomplishes an automatic steering of the electric power steering.

Accordingly, for one sampling cycle, the automotive vehicle travels that sampling cycle's portion on the driving line L, calculated from that cycle's travel target point GP and the automotive vehicle's running direction. Then, at the next sampling cycle, the vehicle travels over a newly calculated driving line L. In this way, as if always pursuing travel target points, the automotive vehicle smoothly traces loci, and the lane keeping controls can be accomplished.

At that time, for as long as control unit 31 at the steering act detecting means does not detect intervening steering acts by the driver, the travel target point setting unit 32 does not renew the distance amount Rgp and keeps it as a fixed value, and keeps the distance of the travel target point GP from the lane marking location as a constant. Therefore, if the lane marking location fluctuates for each sampling cycle, the position of the travel target point GP also fluctuates with it. However, because the distance amount Rgp from the lane marking location is kept as a constant, the automotive vehicle travels while following a lane marking location that would be a norm.

On the other hand, if the driver operates the steering wheel with an objective such as revising the automotive vehicle's travel orbit within the driving lane, the steering torque sensor can detect a steering torque TH greater than a threshold value for determining an intervening steering act by the driver. Then, the control unit 31 determines that an intervening steering act by the driver has occurred and sets the counter which is the measuring means 35 to a count of the sampling cycle number suitable to the prescribed time T lap which was set beforehand.

In this case, as long as the intervening steering acts of the driver are continuing, the travel target point setting unit 32 updates the distance amount Rgp from the lane marking location of the travel target point GP, for each and every sampling cycle, in correspondence with changes in the distance R from the lane marking location to the automotive vehicle. And, during that time, the automotive vehicle's driving line L is decided for each and every sampling cycle at the computation unit 33, the control indicating torque current It is calculated via the response motion unit control unit 34, and based on that the control motion unit A performs the automatic steering of the electric power steering.

The lane keeping controls is done successively even after the intervening steering ends, until the elapsing of the prescribed time T lap. Also during that time, the distance amount Rgp is updated, similarly to that described above. If, once the interference from the intervening steering act by the driver settles and the driver begins to drive at a desired position within the driving lane, the prescribed time T lap passes, then the distance amount Rgp is set at the final distance R between the lane marking location and the automotive vehicle, at the expiration time of the prescribed time T lap.

In this way, during the period T total from when intervening steering acts by the driver are continuing and after the ending of the intervening steering, until the expiration of the prescribed time, the distance amount Rgp is updated in correspondence with changes in the distance R between the lane marking location and the automotive vehicle. Thus, if the driving lane is curved, and the prescribed time T lap after the ending of the intervening steering takes longer, if the driver takes his hands off the steering wheel, depending on the movement characteristics of the vehicle for going straight ahead, the possibility arises that the automotive vehicle may deviate toward the outside when taking the curve.

For that reason, when the driving lane curves, by making the prescribed time T lap, after the ending of the intervention, 0 or otherwise shortening it, the separation distance Rgp can then be set before the automotive vehicle deviates from the lane marking, and the automotive vehicle's lane marking deviations can be prevented.

Also, if the distance amount Rgp updated by the intervening steering act of the driver, approaches a left-right lane marking location further than the prescribed distance Rbound, once the intervening steering act is gone, the separation distance Rgp is slowly increased for each and every sampling cycle. The travel target point GP is moved toward the middle of the driving lane, and the automotive vehicle is pulled back to within the driving lane. By pulling back the automotive vehicle to within the driving lane in this way, contacts or collisions with other vehicles traveling within an adjacent driving lane can be evaded.

In the above manner, with the lane keeping assistance equipment 1 of the present embodiment, if an intervening steering act by the driver is not detected, even if the automotive vehicle's distance R relative to a lane marking location changes, the distance amount Rgp is not changed and the distance from the lane marking location at the travel target point GP is kept at a constant. Because of this, with the driver's controlling to drive while aiming for the travel target point GP, it is possible for travel to occur while reliably following the lane marking locations.

Additionally, if the driver operates the steering wheel with the objective of revising the automotive vehicle's travel orbit within the driving lane, etc., then during the time period from when intervening steering acts by the driver are continuing and after the ending of the intervening steering, until the expiration of the prescribed time T lap, the distance amount Rgp is updated in correspondence with changes in the distance R between the lane marking location and the automotive vehicle. For that reason, even at the time of an intervening steering act, the control actions of the lane keeping controls do not need to temporarily stop, and they can continue.

Also, because the distance amount Rgp is updated in correspondence with fluctuations in the distance R between the lane marking location and the automotive vehicle, the driving line L moves along with the automotive vehicle's movements in the vehicle width direction. Therefore, the sense of malaise that drivers feel when steering the steering wheel, as in the prior art, can be alleviated, and corrections, etc. to the travel orbit of the automotive vehicle can be performed smoothly.

Furthermore, even if the driving lane is curved, there is no need to temporarily stop the control actions of the lane keeping controls. For example, by setting the distance amount Rgp as the distance R between the lane marking location and the automotive vehicle at the point in time when the driver's intervening steering acts end, the driving line L is automatically calculated as described above, and the lane keeping controls will work to travel along that line L. Thus, it become possible to reliably prevent the automotive vehicle's straying from a curved lane marking, and the lane keeping controls can be accomplished in a stable manner.

Still further, the following states alternatives to each part of the control means 3 of the lane keeping assistance equipment 1, that relate to the present embodiment.

The present embodiment has been discussed while using the right lane marking location LR as the standard, when accomplishing the calculation of the distance R between the automotive vehicle and the lane marking location by the control unit 31, as well as for the setting of the distance amount Rgp. It is not necessary to state that the above can also be accomplished while using the left lane marking location LL as the standard. However, the above can be accomplished, as well, with other various points as described below.

For example, a configuration is possible where, out of the left-right lane marking locations LR, LL, one side of the lane marking locations is selected that has the highest degree of parallelism to the automotive vehicle's travel path, or that is closest to the automotive vehicle, or for which a position can be detected in the distance, etc. Then, that side can be made the standard when the distance R between the automotive vehicle and the lane marking location is calculated at the control unit 31, or when the distance amount Rgp is set at the travel target point setting unit 32.

As another example, a configuration is possible where the center of the driving lane calculated from the left-right lane marking locations LR, LL can be made the standard. Then, the distance R can be calculated as the distance between the automotive vehicle and the center of the driving lane, and the distance amount Rgp can be set as the distance of the travel target point GP to the center of the driving lane.

And, as still another example, a configuration is possible where, a ratio is calculated of the road width of the driving lane calculated from the left-right lane marking locations LR, LL, to the distances from either of the left-right lane marking locations to the automotive vehicle. Then, the distance from the lane marking location to the travel target point GP is calculated by applying this ratio to the road width of the driving lane at the spot P, and that distance can be set as the distance amount Rgp.

On the other hand, a configuration is possible where, for example, the control unit 31 is prepared as a vehicle use travel assistance apparatus as according to Japanese Patent Application Publication No. 2005-41308, or as a wakefulness estimation means for estimating the wakefulness degree of a driver as according to Japanese Patent Application Publication No. 2005-71185.

With such configurations, a further configuration is possible where if, through the above-mentioned wakefulness estimating means, it is determined that the driver's wakefulness degree is falling, the updated prescribed distance Rbound shown in FIG. 11 can be set to be greater. Then, the distance amount Rgp can be pulled back even further toward the inside, that is, to a position closer to the center of the driving lane. With such a configuration, the automotive vehicle can be reliably pulled back toward the driving lane's center, and one can avoid situations where the automotive vehicle touches or collides with another vehicle traveling in an adjacent lane.

If it is determined that the driver's wakefulness degree is falling, one can also configure the travel target point GP to be set at the center of the driving lane. With that type of configuration, similarly to the above description, the automotive vehicle can again be reliably pulled back toward the driving lane's center, and one can evade situations where the automotive vehicle touches or collides with another vehicle traveling in an adjacent lane. This setting of the travel target point GP at the center of the driving lane fulfills a fail-safe function in the present invention.

If it is determined by the above-mentioned wakefulness estimation means that the driver's wakefulness degree is falling, it is also possible to increase the movement amounts of the distance amount Rgp per unit time, so that the automotive vehicle MC is more greatly pulled back toward the direction of the center of the driving lane. It becomes possible to awaken the driver.

Figure 15:
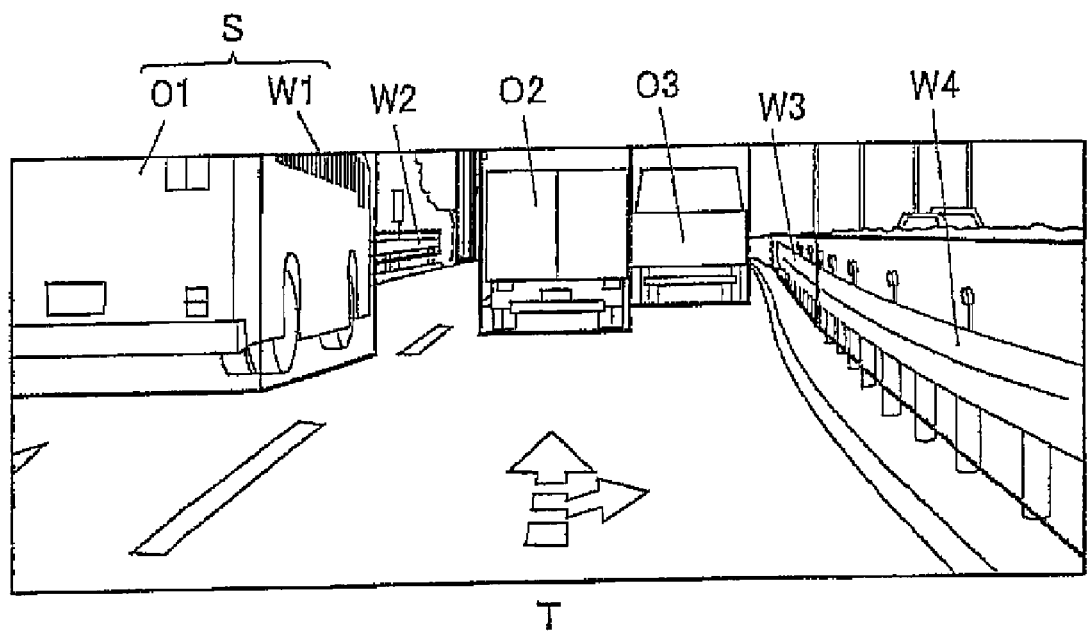
FIG. 15 is an illustration showing a solid object, objects and side walls, which have been detected within the standard image.

Furthermore, it is possible for the control unit 31, for example, to be equipped with an outer-vehicle monitoring device as according to Japanese Patent Application Publication No. Hei10-283477, as a solid object detecting means. Through that device, as shown in FIG. 15, within a standard image T, objects 01-03, side walls W1-W4, and a solid object S can be detected.

With this kind of configuration, furthermore, if the above-mentioned solid object detecting means detects at the automotive vehicle's front, the existence of another vehicle in an adjacent driving lane, the above-mentioned renewal of the distance amount Rgp can be made to not renew in a direction toward the other vehicle that was detected. By configuring in this manner, the travel target point GP will at least not move in the direction of the automotive vehicle's nearing the other vehicle. Thus, situations where the automotive vehicle touches or collides with another vehicle traveling in an adjacent lane can be evaded.

Also, when the automotive vehicle travels along a straight road, the possibility of the automotive vehicle's straying from the lane marking is decreased, compared to when traveling along a curved road. Thus, a configuration may also be preferable where if the curvature of the road exceeds a fixed threshold value, and when steering acts of the driver are detected, the control actions of the lane keeping controls are interrupted. As thus configured, when traveling along a driving lane considered to be a straight road, interference between the driver's steering acts and the lane keeping controls can be prevented. When traveling along a curved road, one can travel while following the lane marking, without being accompanied by temporary stoppages of the lane keeping controls.

What is claimed is:

1. A lane keeping assistance equipment loaded on an automotive vehicle having a response motion unit for controlling a steering of the automotive vehicle traveling on a traffic lane between lane markings, comprising:

a lane marking detecting device for detecting a lane marking location;

a sideways distance detecting device for detecting, based on said lane marking location detected by said lane marking detecting device, a sideways distance between the lane marking location and the automotive vehicle;

a control device for performing lane keeping controls by creating and setting a travel target point at a position apart from said lane marking location, and transmitting a signal to the response motion unit for the automotive vehicle to travel on the travel target point involved;

an intervening steering act detecting device for detecting intervening steering acts by a driver driving the automotive vehicle; and a measuring device for measuring an elapsing time after said intervening steering detected by said intervening steering act detecting device, wherein said control device updates a distance amount between said travel target point and the lane marking location, in correspondence with changes in the distance between said lane marking location and the automotive vehicle, at a time period during a continuing intervening steering act by the driver and an elapsing of a prescribed time after the ending of the steering act, and after said prescribed time elapses, sets the distance amount to said updated distance amount at the end of the elapsing of the prescribed time.

2. The lane keeping assistance equipment of claim 1, wherein said control device changes said prescribed time based on a road curvature.

3. The lane keeping assistance equipment of claim 2, wherein said control device shortens said prescribed time based on said road curvature.

4. The lane keeping assistance equipment of claim 1, wherein if a vehicle speed inputted from a vehicle sensor is greater than a predetermined threshold value, said prescribed time is shortened from when said vehicle speed is less than said threshold value.

5. The lane keeping assistance equipment of claim 1, wherein if said updated distance amount is smaller than a prescribed distance set beforehand, as said travel target point approaches a left-right lane marking location, then if an intervention from a steering act by said driver is not being detected, said control device increases said distance amount and causes said travel target point to move in a direction toward a center of a driving lane.

6. The lane keeping assistance equipment of claim 5, wherein the moving of said travel target point ends at the point in time when said distance amount becomes equal to said prescribed distance or at the point in time when the distance amount becomes greater than the prescribed distance.

7. The lane keeping assistance equipment of claim 5, further comprising a wakefulness estimation device for estimating a wakefulness of the driver, wherein if a determination is made from an estimation result by said wakefulness estimation device that the driver's wakefulness is falling, then said control device increases said prescribed distance.

8. The lane keeping assistance equipment of claim 1, wherein said intervening steering detecting device detects an intervening steering act by said driver at least at an occurrence of a steering torque inputted from a steering torque sensor exceeding a predetermined threshold value, or at the steering torque's being inputted continuously in excess of a predetermined continuation time period, or at a differential value of a steering angle of a steering wheel, inputted from a steering angle sensor, being in excess of a predetermined threshold value.

9. The lane keeping assistance equipment of claim 1, wherein said sideways distance detecting device selects a lane marking location at one side of the left-right lane marking locations, and detects the distance between the lane marking location and the automotive vehicle based on said lane marking location detected by the lane marking detecting device, and said control device sets the travel target point at a fixed distance frontward of the automotive vehicle, at a position separated only by said distance amount from the lane marking location at said one side, which was selected by said sideways distance detecting device.

10. The lane keeping equipment of claim 1, wherein said sideways distance detecting device calculates a center of a driving lane based on said detected lane marking location, and detects a distance between said center of the driving lane and the automotive vehicle, and said control device calculates the center of the driving lane based on said lane marking location at a fixed distance frontward of the automotive vehicle, and sets the travel target point at a position separated only by said distance from said center of the driving lane to the automotive vehicle.

11. The lane keeping assistance equipment of claim 1, wherein said sideways distance detecting device calculates a width of a driving lane based on said detected lane marking location, and detects a ratio of distances to the lane marking location and the automotive vehicle regarding said driving lane width, and said control device calculates the distance amount from said lane marking location by applying said ratio to said driving lane width at a fixed distance frontward of the automotive vehicle, and sets the travel target point at a position separated from said lane marking location only by that specific calculated distance amount.

12. The lane keeping assistance equipment of claim 1, further comprising a solid object detecting device for detecting a solid object within a picked-up image, wherein if an existence of another vehicle at an adjacent driving lane, frontward of the automotive vehicle, is detected by said solid object detecting device, then said control device does not perform an updating of said distance amount in a direction toward said detected other vehicle.

13. The lane keeping assistance equipment of claim 1, wherein if a lane marking location is not detected by said lane marking detecting device, or the automotive vehicle is turning right or turning left, or the automotive vehicle is moving to an adjacent driving lane through lane changing, then said control device interrupts the control actions of said lane keeping controls.

14. The lane keeping assistance equipment of claim 1, wherein if an edge at the side of the automotive vehicle straying from the lane marking goes over the concerned lane marking by greater than a predetermined distance to the outside, then said control device interrupts the control actions of said lane keeping controls.

15. The lane keeping assistance equipment of claim 13, wherein said control device re-starts the control actions of the lane keeping controls at the stage when, at the original driving lane or the entered driving lane, a space between the automotive vehicle's edge and the corresponding lane marking location becomes greater than a predetermined interval.

16. The lane keeping assistance equipment of claim 13, wherein if the control actions of said lane keeping controls are interrupted, then at the re-starting time of the lane keeping controls, said control device sets as said distance amount the distance between the lane marking location detected by said sideways distance detecting device and the automotive vehicle.

17. The lane keeping assistance equipment of claim 1, wherein at a device activation time, said control device sets as said distance amount the distance between the lane marking location detected by the sideways distance detecting device and the automotive vehicle.

18. The lane keeping assistance equipment of claim 1, wherein if there are excessive steering acts of the steering wheel, then said control device completely stops the control actions of said lane keeping controls.

19. The lane keeping assistance equipment of claim 1, further comprising a wakefulness estimation device for estimating a wakefulness of the driver, wherein if a determination is made from an estimation result by said wakefulness estimation device that the driver's wakefulness is falling, then said control device sets said travel target point at a center of a driving lane.

* * * * *